(12) United States Patent
Aboul-Magd et al.

(10) Patent No.: US 11,184,107 B2
(45) Date of Patent: Nov. 23, 2021

(54) SEMI-ORTHOGONAL MULTIPLE ACCESS COMMUNICATION OF PPDU AND ACKNOWLEDGMENT

(71) Applicant: HUAWEI TECHNOLOGIES CO., LTD., Guangdong (CN)

(72) Inventors: Osama Aboul-Magd, Kanata (CA); Jung Hoon Suh, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 16/241,254

(22) Filed: Jan. 7, 2019

(65) Prior Publication Data
US 2020/0220644 A1 Jul. 9, 2020

(51) Int. Cl.
| | |
|---|---|
| *H04L 1/00* | (2006.01) |
| *H04B 17/336* | (2015.01) |
| *H04W 80/02* | (2009.01) |
| *H04L 27/34* | (2006.01) |

(52) U.S. Cl.
CPC .......... *H04L 1/001* (2013.01); *H04B 17/336* (2015.01); *H04L 27/3483* (2013.01); *H04W 80/02* (2013.01)

(58) Field of Classification Search
CPC ... H04B 17/336; H04L 1/001; H04L 27/3483; H04W 52/262; H04W 74/02; H04W 80/02
See application file for complete search history.

(56) References Cited

U.S. PATENT DOCUMENTS

| | | | |
|---|---|---|---|
| 9,614,711 B2 | 4/2017 | Zhu et al. | |
| 2016/0065401 A1 | 3/2016 | Jia et al. | |
| 2016/0204969 A1* | 7/2016 | Zhu | ...................... H04L 1/0004 375/261 |
| 2017/0063511 A1 | 3/2017 | Kwon et al. | |
| 2017/0359158 A1 | 12/2017 | Lim et al. | |
| 2018/0103487 A1* | 4/2018 | Asterjadhi | ............ H04W 74/02 |

FOREIGN PATENT DOCUMENTS

| | | |
|---|---|---|
| WO | 2016112775 A1 | 7/2016 |
| WO | 2016171873 A1 | 10/2016 |
| WO | 2017185024 A1 | 10/2017 |

OTHER PUBLICATIONS

ISA/CN, International Search Report and Written Opinion for PCT/CN2020/070653 dated Apr. 8, 2020 (9 pages).
IEEE P802.11ax™/D3.2, Draft Standard for Information technology—Telecommunications and information exchange between systems Local and metropolitan area networks—Specific requirements, Part 11: Wireless LAN Medium Access Control (MAC) and Physical Layer (PHY) Specifications Amendment 1: Enhancements for High Efficiency WLAN, Oct. 2018 (698 pages).

(Continued)

*Primary Examiner* — Khoa Huynh
(74) *Attorney, Agent, or Firm* — Trop, Pruner & Hu, P.C.

(57) ABSTRACT

In some examples, a wireless device includes a network interface to communicate over a wireless network, at least one processor configured to send a capabilities information element comprising an indicator to indicate support by the first wireless device for semi-orthogonal multiple access (SOMA) communications over the wireless network.

33 Claims, 4 Drawing Sheets

(56) References Cited

OTHER PUBLICATIONS

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2016, 3534 pages.

Suh et al., U.S. Appl. No. 15/835,218 entitled Semi-Orthogonal Multiple Access With Power-Adaptive Constellation filed Dec. 7, 2017 (68 pages).

* cited by examiner

SEMI-ORTHOGONAL MULTIPLE ACCESS COMMUNICATION OF PPDU AND ACKNOWLEDGMENT

BACKGROUND

A goal of successive generations of radio frequency communications systems is to apply techniques that can increase the amount of information transmitted using communication resources as compared to prior techniques. A Semi-Orthogonal Multiple Access (SOMA) technique allows multiple wireless devices to use superposed constellations to share a wireless spectrum. The superposed constellations of SOMA are formed from constituent constellations that use respective different modulation layers.

In a wireless network, wireless devices can be deployed that have different capabilities. Wireless devices can include access points (APs) as well as other electronic devices that are able to perform wireless communications. Some wireless devices may support SOMA communications, and other wireless devices may not support SOMA communications. Incompatibilities in the capabilities of different wireless devices may cause communication failures or errors between such wireless devices. It is desired that techniques or mechanisms be provided to achieve compatible SOMA communications.

SUMMARY

According to aspects of the present disclosure, wireless devices are able to exchange capabilities information with other wireless devices for indicating support for SOMA communications over a wireless network, such as a wireless local area network (WLAN). A first wireless device can send a capabilities information element to a second wireless device. The capabilities information element includes an indicator settable to a value that indicates support by the first wireless device for SOMA communications over the wireless network. The first wireless device can further receive, from the second wireless device, a capabilities information element including an indicator settable to a value that indicates support by the second wireless device for SOMA communications over the wireless network. Based on the exchanged capabilities information elements, the first and second wireless devices can communicate data using SOMA communications. By exchanging such capabilities information, a wireless device can confirm that another wireless device supports SOMA communications before initiating such SOMA communications. In this manner, communication errors due to incompatibilities between wireless devices can be avoided or reduced.

According to further aspects of the present disclosure, recipient wireless devices that receive respective data from a sender wireless device are able to send acknowledgments of the respective data to the sender wireless device. The acknowledgments are sent in corresponding resource units of the wireless network. The resource units to be used by the recipient wireless devices to send the acknowledgments can be identified in control information sent by the sender wireless device to the recipient wireless devices. For example, the control information can be included in a header of a data frame or can be included in a trigger frame.

According to an aspect of the present disclosure, there is provided a first wireless device comprising a network interface to communicate over a wireless network, and at least one processor configured to send a capabilities information element comprising at least one indicator. The at least one indicator has a first value to indicate support by the first wireless device for use of a single user physical layer conformance procedure (PLCP) protocol data unit (SU PPDU) in a semi-orthogonal multiple access (SOMA) communication over the wireless network, and a second value to indicate support by the first wireless device for use of a multiple user PPDU (MU PPDU) in a SOMA communication over the wireless network.

According to another aspect of the present disclosure, there is provided a method of a first wireless device, comprising sending a capabilities information element comprising at least one indicator. The at least one indicator has a first value to indicate support by the first wireless device for use of an SU PPDU in a SOMA communication over the wireless network, and a second value to indicate support by the first wireless device for use of an MU PPDU in a SOMA communication over the wireless network.

According to a further aspect of the present disclosure, there is provided a first wireless device comprising a network interface to communicate over a wireless network, and at least one processor configured to send, over the wireless network, an SU PPDU to a plurality of recipient wireless devices using a SOMA communication, and receive, from the plurality of recipient wireless devices, acknowledgments of the SU PPDU.

According to a further aspect of the present disclosure, there is provided a method of a first wireless device, comprising sending, over a wireless network, an SU PPDU to a plurality of recipient wireless devices using a SOMA communication, and receiving, from the plurality of recipient wireless devices, acknowledgments of the SU PPDU.

According to a further aspect of the present disclosure, there is provided a first wireless device comprising a network interface to communicate over a wireless network, and at least one processor configured to receive, from a sender wireless device in a SOMA communication, an SU PPDU containing data for a plurality of recipient wireless devices including the first wireless device, receive, from the sender wireless device, control information regarding a resource to be used by the first wireless device to send an acknowledgment of the SU PPDU, and send, to the sender wireless device, the acknowledgment of the SU PPDU using the resource.

According to a further aspect of the present disclosure, there is provided a method of a first wireless device, comprising receiving, from a sender wireless device in a SOMA communication, an SU PPDU containing data for a plurality of recipient wireless devices including the first wireless device, receiving, from the sender wireless device, control information regarding a resource to be used by the first wireless device to send an acknowledgment of the SU PPDU, and sending, to the sender wireless device, the acknowledgment of the SU PPDU using the resource Optionally, in any of the preceding aspects, in another implementation, the indicator has a third value to indicate support by the first wireless device for use of both an SU PPDU and an MU PPDU in a SOMA communication over the wireless network.

Optionally, in any of the preceding aspects, in another implementation, the at least one processor is configured to receive, from a second wireless device, a capabilities information element comprising at least one indicator set to the first value or the second value, and perform SOMA communications with the second wireless device over the wireless network using an SU PPDU or an MU PPDU according to the value of the at least one indicator included in the capabilities information element sent by the first wireless device, and the value of the at least one indicator included in the capabilities information element received from the second wireless device.

Optionally, in any of the preceding aspects, in another implementation, the capabilities information element comprises a Medium Access Control (MAC) capabilities information element.

Optionally, in any of the preceding aspects, in another implementation, the at least one indicator when set to another value indicates lack of support by the wireless device for SOMA communications over the wireless network.

Optionally, in any of the preceding aspects, in another implementation, the capabilities information element further comprises at least a second indicator that specifies a power allocation factor that indicates an allocation of power between constituent constellations that are superposed to form a modulation constellation comprising constellation points representing respective data values communicated using SOMA.

Optionally, in any of the preceding aspects, in another implementation, the at least the second indicator is settable to one of a plurality of values to indicate corresponding different power allocation factors, each power allocator factor of the different power allocation factors indicating a respective allocation of power between constituent constellations that are superposed to form a modulation constellation comprising constellation points representing respective data values communicated using SOMA.

Optionally, in any of the preceding aspects, in another implementation, an SU PPDU when used for a SOMA communication occupies an entire channel bandwidth of one transmission resource of the wireless network for carrying data to respective recipient wireless devices, wherein the SU PPDU carries data modulated using a first modulation layer associated with a first constituent constellation for a first recipient wireless device, and the SU PPDU carries data modulated using a second modulation layer associated with a second constituent constellation for a second recipient wireless device, and wherein the first and second constituent constellations are superposed to form a superposed constellation.

Optionally, in any of the preceding aspects, in another implementation, an MU PPDU when used for a SOMA communication occupies respective one or more resource units of a transmission resource of the wireless network for carrying data to respective recipient wireless devices, the one or more resource units reserved for the SOMA communications, wherein the MU PPDU carries data modulated using a first modulation layer associated with a first constituent constellation for a first recipient wireless device, and the MU PPDU carries data modulated using a second modulation layer associated with a second constituent constellation for a second recipient wireless device, and wherein the first and second constituent constellations are superposed to form a superposed constellation.

Optionally, in any of the preceding aspects, in another implementation, the at least one processor is configured to send respective data using SOMA communications to a plurality of recipient wireless devices, and receive acknowledgments of the respective data from the plurality of recipient wireless devices.

Optionally, in any of the preceding aspects, in another implementation, the at least one processor is configured to send, to the plurality of recipient wireless devices, control information identifying resource units to be used by the plurality of recipient wireless devices in transmitting the acknowledgments to the first wireless device.

Optionally, in any of the preceding aspects, in another implementation, the control information is included in a header carried by a data frame sent to the plurality of recipient wireless devices.

Optionally, in any of the preceding aspects, in another implementation, the control information is included in a trigger frame to cause transmission of trigger-based data frames from the plurality of recipient wireless devices, the acknowledgments included in the trigger-based data frames.

Optionally, in any of the preceding aspects, in another implementation, the respective data is sent using an SU PPDU to the plurality of recipient wireless devices, and the received acknowledgments are of the SU PPDU.

Optionally, in any of the preceding aspects, in another implementation, the respective data is sent using an MU PPDU to the plurality of recipient wireless devices, and the received acknowledgments are of the MU PPDU.

Optionally, in any of the preceding aspects, in another implementation, the at least one processor is configured to send, to the plurality of recipient wireless devices, control information identifying resource units to be used by the plurality of recipient wireless devices in transmitting the acknowledgments to the first wireless device.

Optionally, in any of the preceding aspects, in another implementation, the control information is included in a header carried by the SU PPDU.

Optionally, in any of the preceding aspects, in another implementation, the control information is included in a trigger frame to cause transmission of trigger-based data frames from the plurality of recipient wireless devices, the acknowledgments included in the trigger-based data frames.

BRIEF DESCRIPTION OF THE DRAWINGS

Some implementations of the present disclosure are described with respect to the following figures.

Figure 1A:
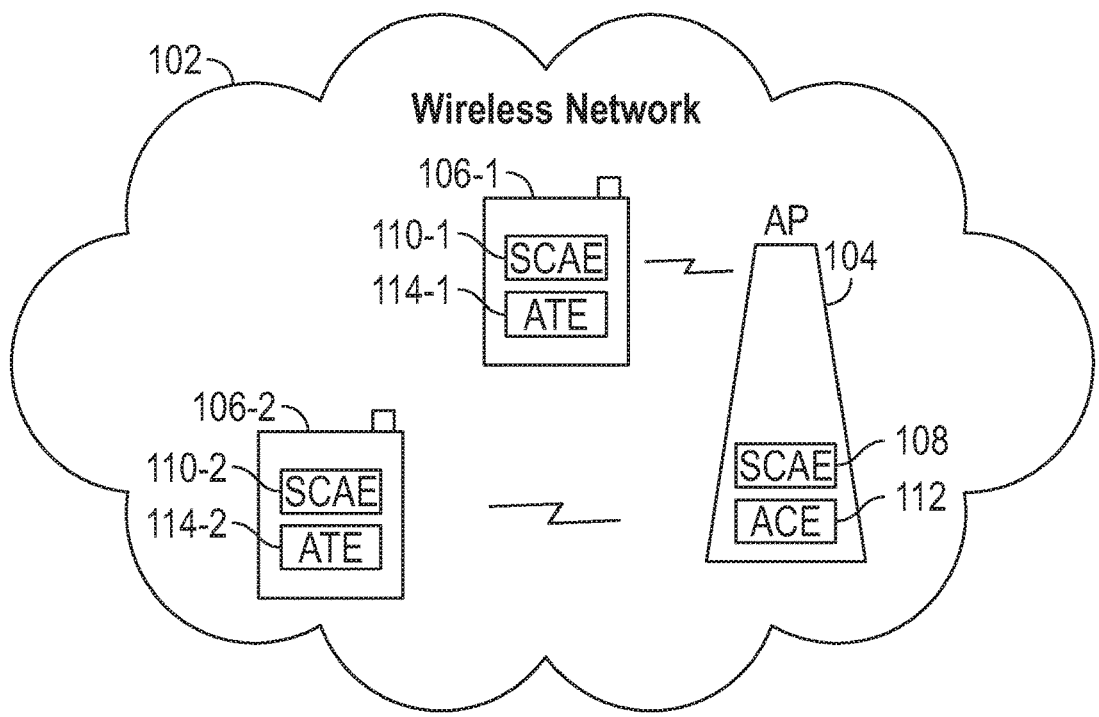
FIG. 1A is a block diagram of an example wireless arrangement that includes wireless devices that are capable of performing Semi-Orthogonal Multiple Access (SOMA) communications according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Semi-Orthogonal Multiple Access (SOMA) refers to a communication technique that uses hierarchical modulation to simultaneously transmit information using different modulation layers. In some cases, the different modulation layers can be assigned to different wireless devices.

In SOMA, superposed symbol constellations are formed from constituent constellations that use respective different modulation layers. The symbols of a superposed symbol constellation include sub-symbols of a first modulation layer, sub-symbols of a second modulation layer, and so forth. The sub-symbols of the different modulation layers have different decoding reliabilities. Sub-symbols of the first modulation layer with a lower decoding reliability can be used for high signal-to-noise ratio (SNR) channels between wireless devices. Sub-symbols of the second modulation layer with higher decoding reliability can be used for lower SNR channels between wireless devices.

Figure 1B:
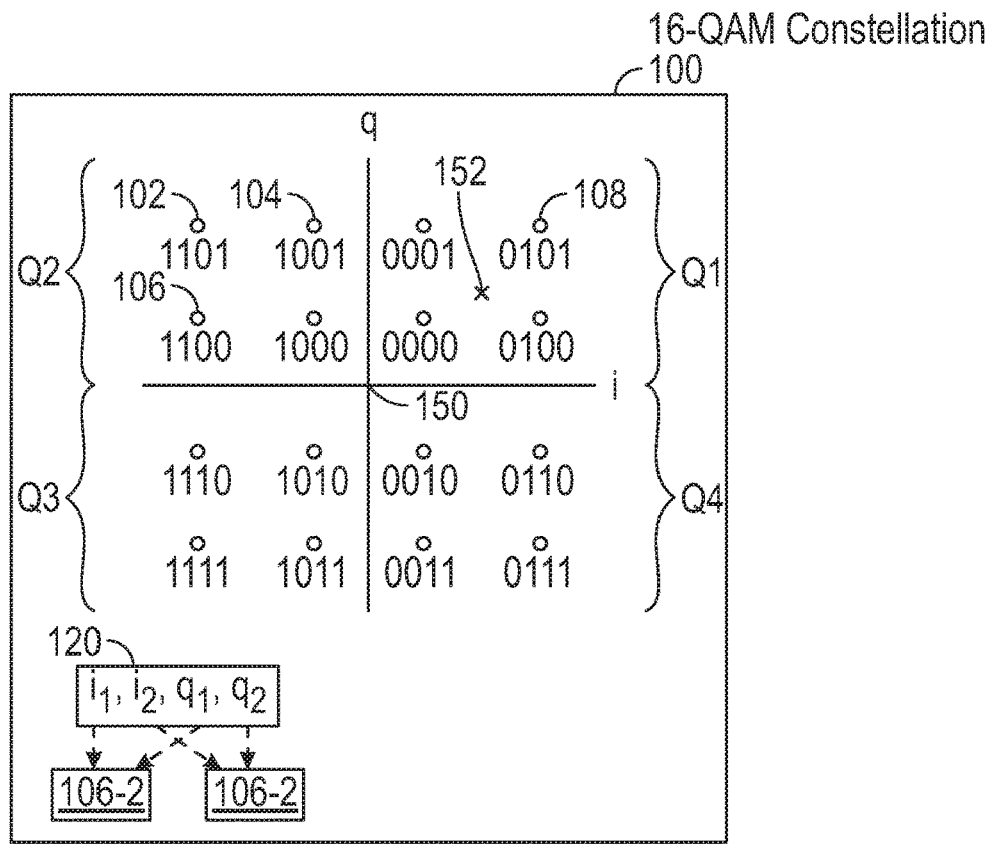
FIG. 1B is a block diagram of a modulation constellation formed from constituent constellations according to some examples.

In some examples, SOMA can employ quadrature amplitude modulation (QAM). FIG. 1A shows an example wireless network 102. FIG. 1B shows a QAM constellation that can be used by wireless devices to communicate over the wireless network 102.

FIG. 1B shows a 16-QAM constellation 100, which includes 16 constellation points (represented by respective dots in FIG. 1). Each constellation point in the 16-QAM constellation 100 represents 4 bits, e.g., $i_1 i_2 q_1 q_2$. The i bits (along the i-axis) are the in-phase components, and the q bits (along the q-axis) are the quadrature-phase components. When the constellation points are mapped using a Gray code, for example, constellation point 102 represents value 1101, constellation point 104 represents value 1001, constellation point 106 represents value 1100, constellation point 108 represents value 0101, and so forth. Adjacent constellation points differ by a single bit. For example, constellation points 102 and 104 differ at bit $i_2$, constellation points 102 and 106 differ at bit $q_2$, and constellation points 102 and 108 differ at bit $i_1$.

In the 16-QAM constellation 100, bits $i_1$ and $q_1$ are the most reliable bits, and bits $i_2$ and $q_2$ are the least reliable bits.

In a 64-QAM constellation, each constellation point represents 6 bits ($i_1 i_2 i_3 q_1 q_2 q_3$). In the 64-QAM constellation, bits $i_1$ and $q_1$ are the most reliable bits, bits $i_3$ and $q_3$ are the least reliable bits, and bits $i_2$ and $q_2$ have intermediate reliability between bits $i_1$ and $q_1$ and bits $i_3$ and $q_3$.

The example wireless network 102 of FIG. 1A includes an AP 104 that is able to communicate wirelessly with electronic devices 106-1 and 106-2. The AP 104 and the electronic devices 106-1 and 106-2 are examples of wireless devices that are able to perform wireless communications.

In some examples, the AP 104 and electronic devices 106-1 and 106-2 are able to communicate according to the Institute of Electrical and Electronic Engineers (IEEE) 802.11 group of standards. In such examples, the wireless network 102 is referred to as a wireless local area network (WLAN).

In other examples, the AP 104 and electronic devices 106-1 and 106-2 can communicate according to other standards, such as wireless standards including a Long-Term Evolution (LTE) standard as promulgated by the Third Generation Partnership Project (3GPP). In further examples, a wireless standard can include a Fifth Generation (5G) wireless standard. In a wireless network, an AP is referred to as a base station, such as an Evolved NodeB (eNB) for LTE.

Although just one AP 104 is shown in FIG. 1A, it is noted that the wireless network 102 can include multiple APs that define respective coverage areas for communicating with electronic devices. Additionally, more than two electronic devices are able to communicate with the one or more APs.

Examples of the electronic devices 106-1 and 106-2 include any or some combination of the following: a desktop computer, a notebook computer, a tablet computer, a smartphone, an Internet-of-Things (IoT) device (e.g., a sensor, a camera, a thermostat, a household appliance, etc.), a wearable device (e.g., a smartwatch, smart eyeglasses, a head-mounted device, etc.), a vehicle, server computers, storage devices, communication nodes, and so forth.

In the example of FIG. 1A, the electronic device 106-1 is in closer proximity to the AP 104 than the electronic device 106-2. Accordingly, because wireless signals between the AP 104 and the electronic device 106-1 travel a shorter distance than wireless signals between the AP 104 and the electronic device 106-2, the SNR of a communication channel between the AP 104 and the electronic device 106-1 can be higher than the SNR of a communication channel between the AP 104 and the electronic device 106-2.

It is noted that the SNR of a communication channel between wireless devices can be impacted by other factors, such as presence of obstacles between the wireless devices, presence of interference sources in the proximity of the wireless devices, and so forth.

When SOMA is used for communications between the AP 104 and the electronic devices 106-1 and 106-2, the more reliable bits of a QAM constellation are allocated to the electronic device (e.g., 106-2) with a lower SNR communication channel, and the less reliable bits are allocated to the electronic device (e.g., 106-1) with a higher SNR communication channel. The assignment of the more reliable bits of the QAM constellation to the lower SNR communication channel increases the probability of successful decoding of data communicated over the lower SNR communication channel.

In 16-QAM constellation, bits $i_1 i_2 q_1 q_2$ form a symbol 120 (as shown in FIG. 1B). For SOMA communication, the symbol 120 can be divided into a first sub-symbol that includes bits $i_1$ and $q_1$, and a second sub-symbol that includes bits $i_2$ and $q_2$. The first sub-symbol ($i_1$ and $q_1$) is used in a first constituent QAM layer, and the second sub-symbol ($i_2$ and $q_2$) is used in a second constituent QAM layer. The first constituent QAM layer and the second constituent QAM layer form a superposed constellation for SOMA. The first constituent QAM layer (based on the more reliable bits $i_1$ and $q_1$) is used to modulate data transmitted on the higher SNR communication channel between the electronic device 106-1 and the AP 104, and the second constituent QAM layer layer (based on the less reliable bits $i_2$ and $q_2$) is used to modulate data transmitted on the lower SNR communication channel between the electronic device 106-2 and the AP 104.

As shown in FIG. 1B, bits $i_2$ and $q_2$ (the least reliable bits) of the 16-QAM constellation 100 are assigned to the electronic device 106-1 (which has a higher SNR communication channel to the AP 106), and bits $i_1$ and $q_1$ (the most reliable bits) of the 16-QAM constellation 100 are assigned to the electronic device 106-2 (which has a lower SNR communication channel to the AP 106).

To ensure compatibility between wireless devices when performing SOMA communications, each wireless device can be provided with a SOMA capability advertising engine (SCAE). For example, the AP 104 includes a SOMA capability advertising engine (SCAE) 108, the electronic device 106-1 includes a SOMA capability advertising engine (SCAE) 110-1, and the electronic device 106-2 includes a SOMA capability advertising engine (SCAE) 110-2.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The SOMA capability advertising engine (SCAE) 108 of the AP 104 is able to send, in a capabilities information element, an indicator to indicate support by the AP 104 for SOMA communications over the wireless network 102. Similarly, each SOMA capability advertising engine (SCAE) 110-1 or 110-2 of the respective electronic device 106-1 or 106-2 is able to send, in a capabilities information element, an indicator to indicate support by the electronic device 106-1 or 106-2 for SOMA communications over the wireless network 102.

In some examples, the SOMA capability advertising engine (SCAE) 108, 110-1 or 110-2 can be part of a Medium Access Control (MAC) layer of the respective wireless device 104, 106-1, or 106-2. The MAC layer communicates data in MAC data frames over a network.

In examples in which the SOMA capability advertising engine (SCAE) is part of the MAC layer, the capabilities information element used to communicate the indicator of support for SOMA communications can be a MAC information element. The capabilities information element can be included in a beacon, a message frame associated with establishing an association between a wireless device and an AP, or another control message.

In some examples, the SOMA indicator can be included in a capabilities information element modified from a capabilities information element defined by current standards. In alternative examples, the SOMA indicator can be included in a different capabilities information element, which can be newly defined (i.e., does not exist in current standards but which may or may not exist in future standards).

The AP 104 further includes an acknowledgment control engine (ACE) 112 that is able to control how the electronic devices 106-1 and 106-2 are to acknowledge receipt of data frames sent by the AP 104 using SOMA communications. For example, the acknowledgment control engine (ACE) 112 can send control information to the electronic devices 106-1 and 106-2 specifying resources to use for acknowledgments of data frames received from the AP 104. Based on the control information from the acknowledgment control engine (ACE) 112, an acknowledgment transmission engine (ATE) 114-1 in the electronic device 106-1 and an acknowledgment transmission engine (ATE) 114-2 in the electronic device 106-2 can send acknowledgments in respective resources identified by the control information. Details regarding the acknowledgments of data frames from the AP 106 are discussed further below in connection with FIGS. 3-5.

Figure 2:
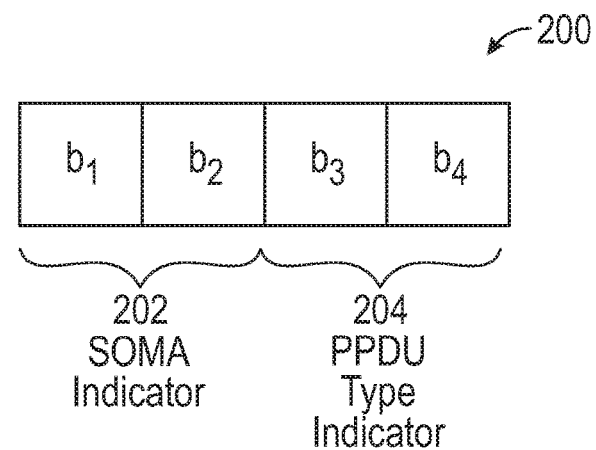
FIG. 2 is a block diagram of an example capability information element according to some implementations of the present disclosure.

FIG. 2 is a block diagram of a portion of a capabilities information element 200 that includes a SOMA indicator 202 and a physical layer conformance procedure (PLCP) protocol data unit (PPDU) type indicator 204.

In the example shown, the SOMA indicator 202 can be implemented using two bits ($b_1$ and $b_2$). Similarly, the PPDU Type indicator 204 can be implemented using two bits ($b_3$ and $b_4$). The PPDU type indicator 204 is discussed further below.

In other examples, the SOMA indicator 202 and/or the PPDU Type indicator 204 can be implemented using a different number (one or more) of bits. Also, although the SOMA indicator 202 and the PPDU Type indicator 204 are shown as being implemented as part of the same capabilities information element 200, in other examples, the SOMA indicator 202 and the PPDU Type indicator 204 can be part of different information elements.

Table 1 below provides an example mapping between different values of the SOMA indicator 202 and respective indicated SOMA capabilities. A value of 00 of the SOMA indicator 202 indicates lack of support for SOMA communications by the wireless device that transmitted the SOMA indicator 202. A value of 10 of the SOMA indicator 202 indicates support for SOMA communications with a power allocation factor having a first value, $\alpha 1$. The SOMA indicator 202 set to the value 01 indicates support for SOMA communications with a power allocation factor having a second value, $\alpha 2$. The SOMA indicator 202 set to the value 11 indicates support for SOMA communications with a power allocation factor having a third value, $\alpha 3$. The SOMA indicator 202 set to 10, 01, or 11 is exchanged between an electronic device 106-1 or 106-2 and the AP 104, to allow the electronic device 106-1 or 106-2 and the AP 104 to agree to use of SOMA communications with the indicated one of the power allocation factor values.

In some examples, it is assumed that the values of $\alpha 1$, $\alpha 2$, and $\alpha 3$ are different from one another.

TABLE 1

| SOMA indicator ($b_1 b_2$) | Indicated SOMA capability |
|---|---|
| 00 | No SOMA |
| 10 | SOMA with $\alpha 1$ |
| 01 | SOMA with $\alpha 2$ |
| 11 | SOMA with $\alpha 3$ |

In other examples, different values of the SOMA indicator 202 can map to other SOMA capabilities.

A power allocation factor indicates an allocation of power between constituent constellations that are superposed to form a modulation constellation, such as the 16-QAM constellation 100 shown in FIG. 1B. Use of the power allocation factor enables adaptive power control to control the power allocations to each constituent constellation.

The 16-QAM constellation 100 of FIG. 1B includes four quadrants Q1, Q2, Q3, and Q4. Each quadrant includes a respective 4-symbol sub-constellation. For a given power allocation factor $\alpha$, in quadrant Q1, the amplitude level from the constellation origin 150 to the center 152 of the sub-constellation of the quadrant Q1 is $\sqrt{1-\alpha}$, and the amplitude level from the center 152 of the sub-constellation of the quadrant Q1 to the constellation point 108 (representing value 1110) is $\sqrt{\alpha}$. Accordingly, increasing the power allocation factor $\alpha$ results in a greater power allocation for the constituent constellation associated with bits $i_2$ and $q_2$, and results in lower power allocation for the constellation associated with bits $i_1$ and $q_1$.

Thus, increasing the power allocation factor $\alpha$ increases the reliability of the least reliable bits $i_2$ and $q_2$, and decreases the reliability of the most reliable bits $i_1$ and $q_1$. Decreasing the power allocation factor $\alpha$ will have the opposite effect.

In accordance with further implementations of the present disclosure, the PPDU type indicator 204 of FIG. 2 is used for indicating a type of PPDU used with SOMA communications.

A PPDU is a data unit transmitted by a physical (PHY) layer of a wireless device. Additional protocol layers can be provided above the PHY layer, including a MAC layer, and other layers.

A PPDU includes a preamble and one or more data fields. A data field contains a data payload and header information of one or more higher-level protocol layers (e.g., a MAC layer) above the PHY layer. The preamble includes control information associated with the PPDU. In some examples, further details of the preamble of a PPDU are described in IEEE 802.11ax.

Although reference is made to IEEE 802.11ax PPDUs, it is noted that SOMA communications can use other types of data units in other examples.

As provided by IEEE 802.11ax, a PPDU can be according to one of various different types. In some examples, two types of PPDUs can be indicated by the PPDU type indicator 204. A first type of PPDU is referred to as a single user PPDU (SU PPDU), and a second type of PPDU is referred to as a multiple user (MU) PPDU (MU PPDU).

According to IEEE 802.11ax, a resource unit (RU) includes a group of subcarriers that can be allocated to a device for communications among wireless devices. As used here, the term "device" that is allocated communication resources can refer to a WLAN station (STA) or other type of electronic device. The different subcarriers of an RU have different frequencies. For communications using MU PPDUs, a channel, such as an orthogonal frequency-division multiple access (OFDMA) channel, is subdivided into multiple RUs. Each RU is a sub-channel of the channel. MU PPDUs can be communicated in respective different RUs for respective devices. Each RU is assigned to a respective single device.

When communicating data using an SU PPDU, all subcarriers of a channel are assigned to a single RU for communicating the SU PPDU. When communicating an SU PPDU, a channel, such as an OFDMA channel, is not divided into multiple RUs as would be the case when communicating MU PPDUs. More generally, an SU PPDU occupies an entire channel bandwidth of one transmission resource (e.g., an IEEE 802.11ax channel) used to communicate data over a wireless network.

IEEE 802.11ax specifies that an SU PPDU is to communicate data to a single recipient wireless device. However, when an SU PPDU is used with SOMA in some implementations of the present disclosure, the SU PPDU can be used to carry data to multiple recipient wireless devices by using different modulation layers assigned to different recipient wireless devices.

Table 2 below illustrates an example of a mapping between different values of the PPDU Type indicator 204 and the respective PPDU capability.

TABLE 2

| PPDU Type Indicator ($b_3$ $b_4$) | Indicated PPDU capability |
|---|---|
| 00 | No SOMA |
| 10 | SU PPDU |
| 01 | MU PPDU |
| 11 | Both SU PPDU and MU PPDU |

The PPDU Type indicator 204 being set to 00 indicates no support for SOMA communications. The PPDU Type indicator 204 being set to 10 indicates that a wireless device that sent the PPDU Type indicator 204 is capable of supporting SU PPDUs for SOMA communications. The PPDU Type indicator 204 being set to 01 indicates that a wireless device that sent the PPDU Type indicator 204 is capable of supporting MU PPDUs for SOMA communications. The PPDU Type indicator 204 being set to 11 indicates that a wireless device that sent the PPDU Type indicator 204 is capable of supporting both SU PPDUs and MU PPDUs for SOMA communications.

In other examples, other mappings between values of the PPDU Type indicator 204 and other PPDU capabilities are possible.

The AP 104 and the electronic devices 106-1 and 106-2 can each send the PPDU Type indicator 204 set to a value for indicating the PPDU type supported by the respective device. Once the AP 104 and an electronic device 106-1 or 106-2 has exchanged information indicating the type of PPDU supported, the AP 104 and the electronic device 106-1 or 106-2 can perform SOMA communications using the supported PPDU type(s).

Figure 3:
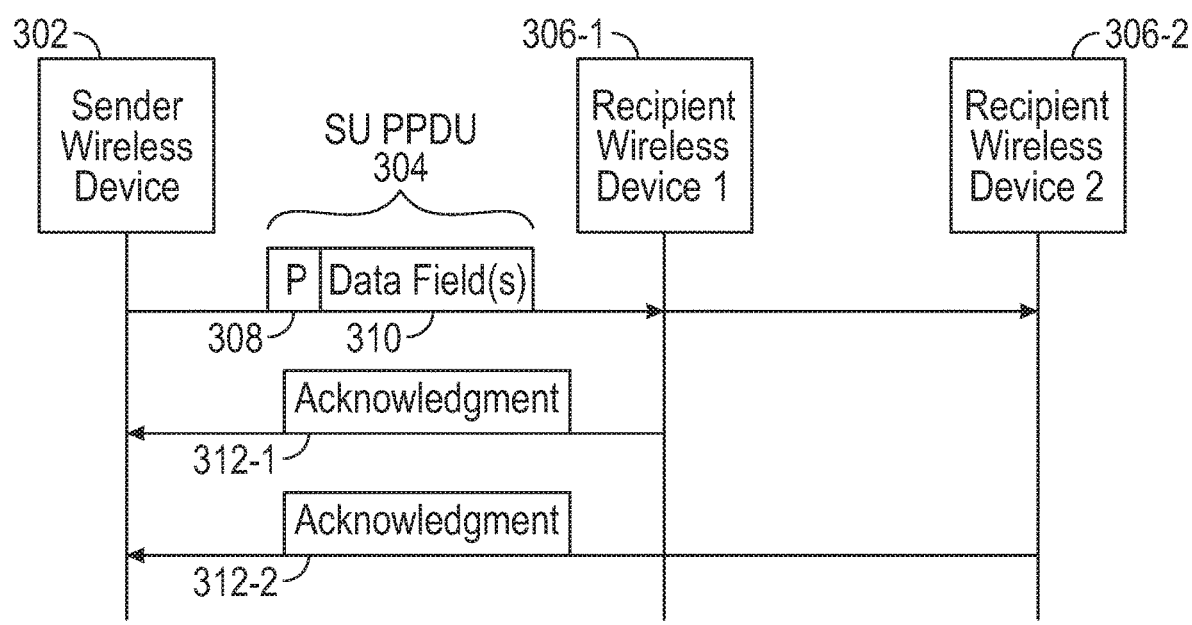
FIGS. 3-5 are message flow diagrams that illustrate communication of a data by a sender wireless device to multiple recipient wireless devices, and the communication of acknowledgements of the data from the multiple recipient wireless devices, according to further implementations of the present disclosure.

FIG. 3 is a flow diagram that shows a sender wireless device 302 sending an SU PPDU 304 to corresponding recipient wireless devices 306-1 and 306-2. In some examples, the sender wireless device 302 can be an AP, such as the AP 104 of FIG. 1. In other examples, the sender wireless device 302 can be a different type of wireless device.

The recipient wireless devices 306-1 and 306-2 can be the electronic devices 106-1 and 106-2, respectively, of FIG. 1A.

Although FIG. 3 shows an example in which an SU PPDU is sent to two recipient wireless devices, in other examples, an SU PPDU can be sent to more than two recipient wireless devices.

The SU PPDU 304 carries data modulated using a first modulation layer (associated with a first constituent constellation) for the recipient wireless device 306-1, and carries data modulated using a second modulation layer (associated with a second constituent constellation) for the recipient wireless device 306-2. The first and second constituent constellations are superposed to form a superposed constellation, such as that shown in FIG. 1B.

The SU PPDU 304 includes a preamble 308 and one or more data fields 310. The one or more data fields 310 carry payload data. The preamble 308 can be considered a header of the SU PPDU 304. The preamble 308 can include an information element that indicates a PPDU type (which in this example is the SU PPDU type).

The one or more data fields 310 of the SU PPDU 304 can carry a data payload. In addition, the SU PPDU 304 can include headers of upper protocol layers, including a MAC layer. Thus, a MAC header can be included in the SU PPDU 304. The MAC header can include information regarding RUs to be used by the respective recipient wireless device 306-1 or 306-2 to send acknowledgements of the SU PPDU 304. If a recipient wireless device 306-1 or 306-2 successfully receives the SU PPDU 304, the recipient wireless device 306-1 or 306-2 sends an acknowledgement to the sender wireless device 302 in the allocated RU.

In examples where the sender wireless device 302 is the AP 104 of FIG. 1, the information regarding RUs to be used by respective recipient wireless device to send acknowledgements can be provided by the acknowledgement control engine (ACE) 112 for inclusion in a MAC header carried by the SU PPDU 304.

The information regarding RUs included in the MAC header can identify the RUs to be used for the acknowledgments. Different RUs can be identified using respective identifiers of the RUs. An identifier of an RU can also be referred to as an RU index.

As further shown in FIG. 3, in response to receiving the SU PPDU 304, the recipient wireless device 306-1 sends an acknowledgement 312-1 to the sender wireless device 304. Similarly, in response to receiving the SU PPDU 304, the recipient wireless device 306-2 sends acknowledgement 312-2 to the sender wireless device 304. The acknowledgments 312-1 and 312-2 are sent in parallel in respective RUs identified in the MAC header carried by the SU PPDU 304. In examples where the recipient wireless devices 306-1 and 306-2 are the respective electronic devices 106-1 and 106-2 of FIG. 1, the acknowledgements 312-1 and 312-2 can be sent by the acknowledgement transmission engines (ATEs) 114-1 and 114-2, respectively.

Figure 4:
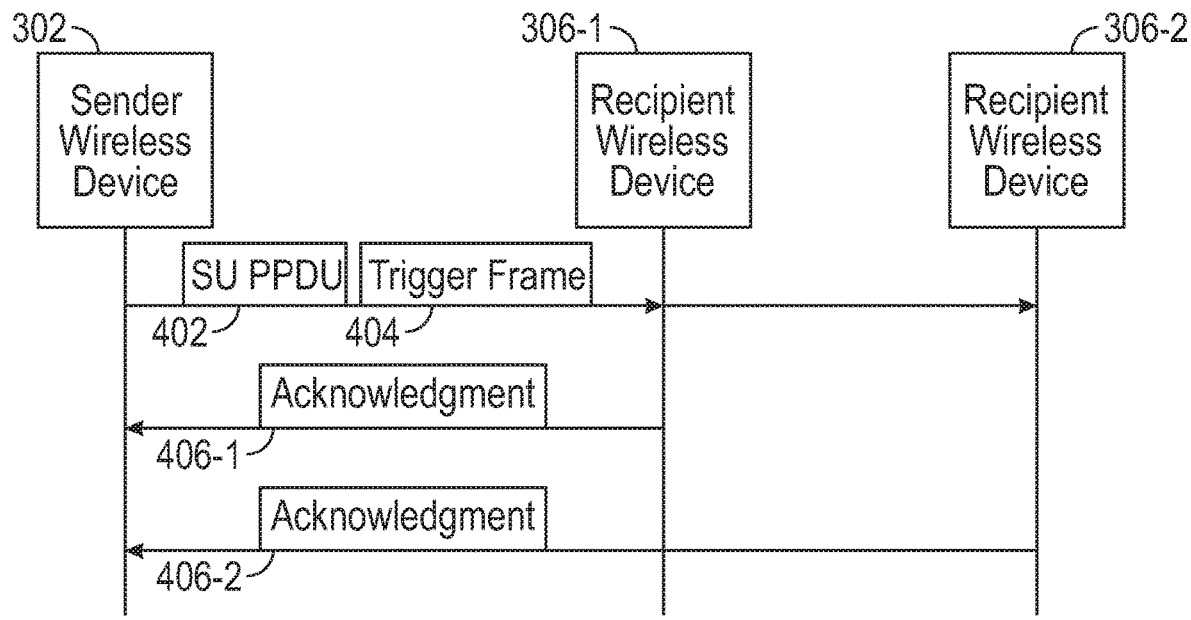

FIG. 4 shows an alternative example in which the sender wireless device 302 sends an SU PPDU 402 to multiple recipient wireless devices 306-1 and 306-2. In the example of FIG. 4, instead of including information regarding RUs for acknowledgments in a MAC header carried by the SU PPDU 402, the sender wireless device 302 further sends a trigger frame 404 that carries control information that identifies RUs to be used for acknowledgments. The recipient wireless devices 306-1 and 306-2 use the identified RUs to send corresponding acknowledgements 406-1 and 406-2 in parallel to the sender wireless device 302. The acknowledgements 406-1 and 406-2 acknowledge the SU PPDU 402 sent by the sender wireless device 302 to the recipient wireless devices 306-1 and 306-2. In examples where the sender wireless device 302 is the AP 104 of FIG. 1, the control information that identifies RUs to be used for acknowledgements can be provided by the acknowledgment control engine (ACE) 112 for inclusion in the trigger frame 404.

In some examples, the trigger frame 404 is according to IEEE 802.11ax. A trigger frame is used to trigger a recipient wireless device to transmit in an uplink direction to the sender wireless device. The trigger frame can identify recipient wireless devices that are to participate in uplink transmissions.

In some examples, the control information including the information regarding the RUs to be used for acknowledgments can be included in an Aggregated Control (A-Control) subfield in a header of the trigger frame 402. The A-Control subfield is discussed further in IEEE 802.11ax.

In the example of FIG. 4, the acknowledgments 406-1 and 406-2 are carried in respective trigger-based (TB) PPDUs, which are PPDUs sent by the recipient wireless devices 306-1 and 306-2 in response to the trigger frame 404. More specifically, in some examples, the A-Control subfield contains triggered response scheduling (TRS) information for soliciting TB PPDUs following the SU PPDU.

The TB PPDUs carrying the acknowledgments 406-1 and 406-2 are communicated in respective RUs identified by the control information in the trigger frame 404. In examples where the recipient wireless devices 306-1 and 306-2 are the respective electronic devices 106-1 and 106-2 of FIG. 1, the acknowledgments 406-1 and 406-2 can be sent by the acknowledgment transmission engines (ATEs) 114-1 and 114-2, respectively.

Figure 5:
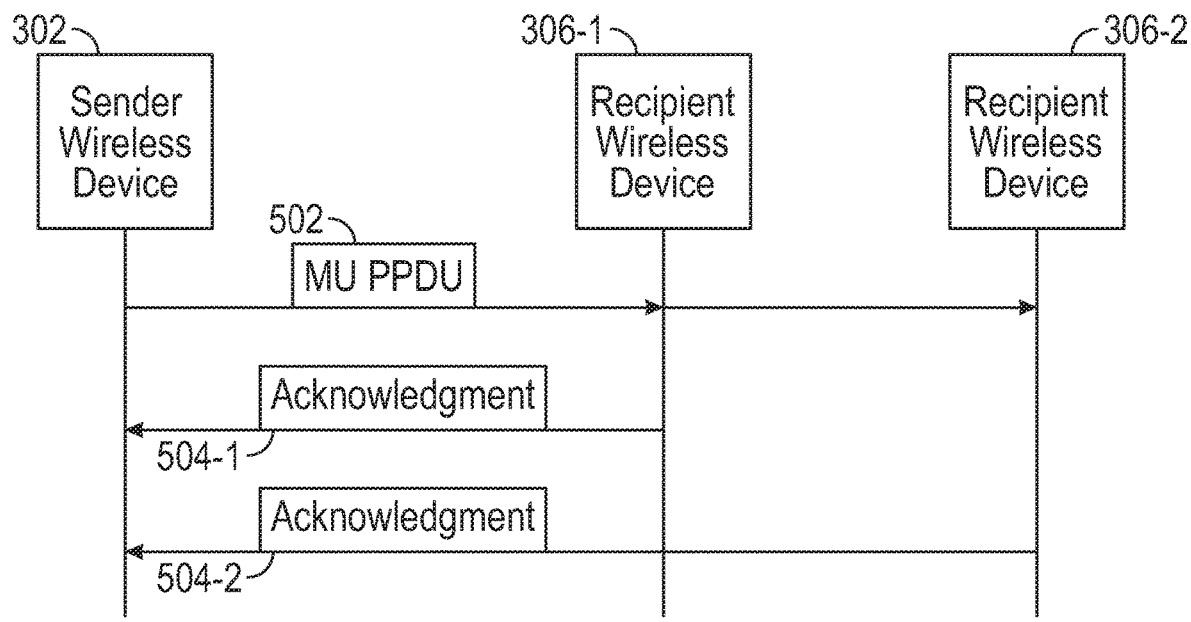

FIG. 5 shows an example where the sender wireless device 302 sends an MU PPDU 502 to the recipient wireless devices 306-1 and 306-2. SOMA can be applied to each of one or more RUs (reserved for SOMA communications) used to communicate the MU PPDU 502. An RU reserved by a wireless network for SOMA communications is an RU allocated by a wireless network for wireless devices to use for SOMA communications. An RU reserved for SOMA communications is not used by wireless devices for any other type of communications, such as OFDMA communications. SOMA communications are performed by wireless devices in the one or more RUs reserved by the wireless network for SOMA communications, and are not performed by wireless devices in RU(s) reserved by the wireless device for other type(s) of communications. Similar to the SU PPDU of FIG. 3 or 4, the MU PPDU 502 carries data modulated using a first modulation layer (associated with a first constituent constellation) for the recipient wireless device 306-1, and carries data modulated using a second modulation layer (associated with a first constituent constellation) for the recipient wireless device 306-2.

To acknowledge the MU PPDU 502, each recipient wireless device 106-1 or 106-2 is able to access information identifying RUs to be used to send acknowledgments. The information identifying RUs can be included in a MAC header carried in the data fields of the MU PPDU 502. In alternative examples, information identifying RUs to be used to send acknowledgements can be carried in a trigger frame.

In examples where the recipient wireless devices 306-1 and 306-2 are the respective electronic devices 106-1 and 106-2 of FIG. 1, the acknowledgments 504-1 and 504-2 are sent by the respective acknowledgment transmission engines (ATEs) 114-1 and 114-2.

Figure 6:
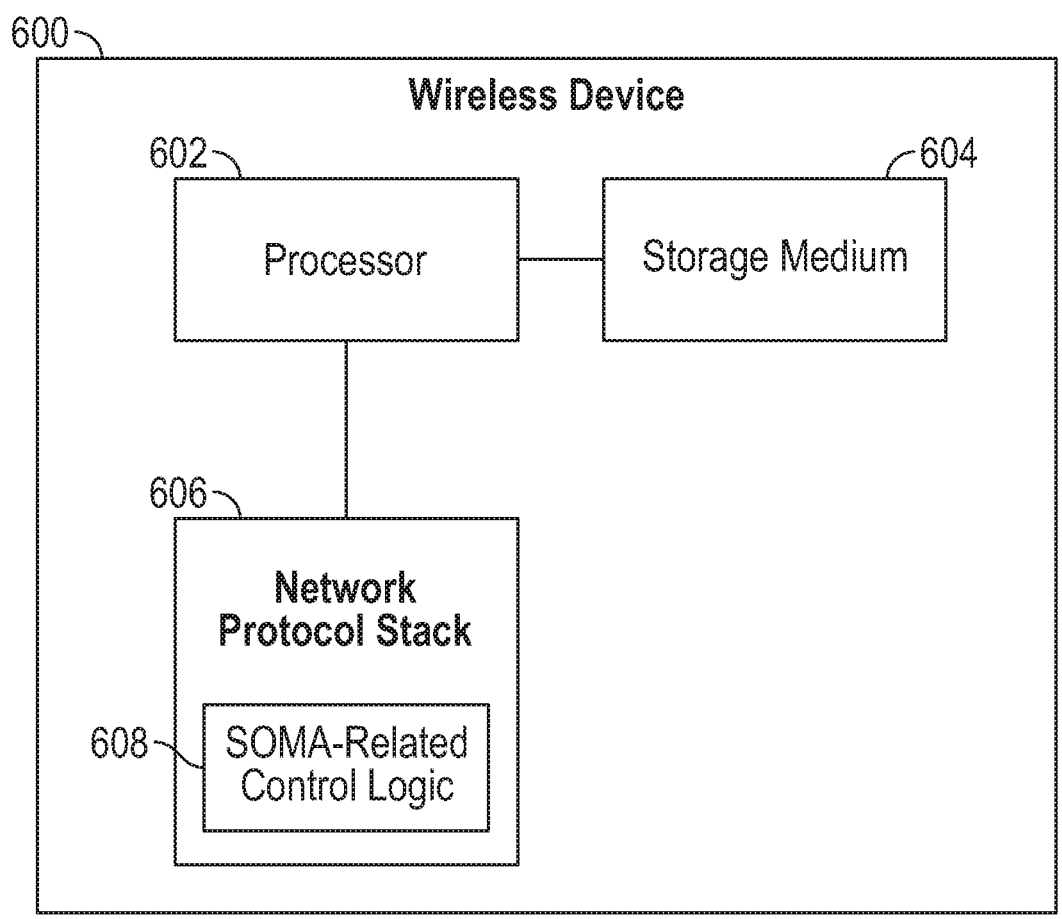
FIG. 6 is a block diagram of a wireless device according to some implementations of the present disclosure.

FIG. 6 is a block diagram of a wireless device 600 according to some examples. The wireless device 600 includes one or more hardware processors 602. A hardware processor can include a microprocessor, a core of a multi-core microprocessor, a microcontroller, a programmable integrated circuit, a programmable gate array, a digital signal processor, or another hardware processing circuit.

The wireless device 600 also includes a non-transitory machine-readable storage medium 604, which can store data and machine-readable instructions that are executable on the one or more hardware processors 602.

In addition, the wireless device includes a network protocol stack 606 (an example of a network interface) that includes various protocol layers, including a PHY layer, a MAC layer, and other protocol layers. The network protocol stack 606 can include SOMA-related control logic 608, implemented with a hardware processing circuit or a combination of a hardware processing circuit and machine-readable instructions. The SOMA-related control logic 608 can perform tasks associated with advertising SOMA capabilities, such as those of the SOMA capabilities advertising engine (SCAE) 108, 110-1, or 110-2 of FIG. 1, tasks associated with controlling or transmitting acknowledgments of SU PPDUs or MU PPDUs, and so forth.

The storage medium 604 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD);

or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first wireless device comprising:
   a network interface to communicate over a wireless network; and
   at least one processor configured to:
      send a capabilities information element comprising at least one indicator having:
         a first value to indicate support by the first wireless device for use of a single user physical layer protocol data unit (SU PPDU) in a semi-orthogonal multiple access (SOMA) communication over the wireless network, and
         a second value to indicate support by the first wireless device for use of a multiple user PPDU (MU PPDU) in a SOMA communication over the wireless network,
      wherein a first SU PPDU when used for a SOMA communication occupies an entire channel bandwidth of one transmission resource of the wireless network for carrying data to respective recipient wireless devices, wherein the first SU PPDU carries data modulated using a first modulation layer associated with a first constituent constellation for a first recipient wireless device, and the first SU PPDU carries data modulated using a second modulation layer associated with a second constituent constellation for a second recipient wireless device, and wherein the first and second constituent constellations are superposed to form a superposed constellation.

2. The first wireless device of claim 1, wherein the at least one indicator has a third value to indicate support by the first wireless device for use of both an SU PPDU and an MU PPDU in a SOMA communication over the wireless network.

3. The first wireless device of claim 1, wherein the at least one processor is configured to:
   receive, from a second wireless device, a capabilities information element comprising at least one indicator set to the first value or the second value; and
   perform SOMA communications with the second wireless device over the wireless network using an SU PPDU or an MU PPDU according to the value of the at least one indicator included in the capabilities information element sent by the first wireless device, and the value of the at least one indicator included in the capabilities information element received from the second wireless device.

4. The first wireless device of claim 1, wherein the capabilities information element comprises a Medium Access Control (MAC) capabilities information element.

5. The first wireless device of claim 1, wherein the at least one indicator when set to another value indicates lack of support by the first wireless device for SOMA communications over the wireless network.

6. The first wireless device of claim 1, wherein the capabilities information element further comprises at least a second indicator that specifies a power allocation factor that indicates an allocation of power between constituent constellations that are superposed to form a modulation constellation comprising constellation points representing respective data values communicated using SOMA.

7. The first wireless device of claim 6, wherein the at least the second indicator is settable to one of a plurality of values to indicate corresponding different power allocation factors, each power allocator factor of the different power allocation factors indicating a respective allocation of power between the constituent constellations.

8. The first wireless device of claim 1, wherein a first MU PPDU when used for a SOMA communication occupies respective one or more resource units of a transmission resource of the wireless network for carrying data to respective recipient wireless devices, the one or more resource units reserved for SOMA communications, wherein the first MU PPDU carries data modulated using the first modulation layer associated with the first constituent constellation for the first recipient wireless device, and the first MU PPDU carries data modulated using the second modulation layer associated with the second constituent constellation for the second recipient wireless device.

9. The first wireless device of claim 1, wherein the at least one processor is configured to:
   send respective data using SOMA communications to a plurality of recipient wireless devices; and
   receive acknowledgments of the respective data from the plurality of recipient wireless devices.

10. The first wireless device of claim 9, wherein the at least one processor is configured to send, to the plurality of recipient wireless devices, control information identifying resource units to be used by the plurality of recipient wireless devices in transmitting the acknowledgments to the first wireless device.

11. The first wireless device of claim 10, wherein the control information is included in a header carried by a data frame sent to the plurality of recipient wireless devices.

12. The first wireless device of claim 10, wherein the control information is included in a trigger frame to cause transmission of trigger-based data frames from the plurality of recipient wireless devices, the acknowledgments included in the trigger-based data frames.

13. The first wireless device of claim 9, wherein the respective data is sent using a given SU PPDU to the plurality of recipient wireless devices, and the received acknowledgments are of the given SU PPDU.

14. The first wireless device of claim 9, wherein the respective data is sent using a first MU PPDU to the plurality of recipient wireless devices, and the received acknowledgments are of the first MU PPDU.

15. The first wireless device of claim 1, wherein the at least one processor is configured to:

control a SOMA communication of the first wireless device using an SU PPDU responsive to the at least one indicator being set to the first value, and
control a SOMA communication of the first wireless device using an MU PPDU responsive to the at least one indicator being set to the second value.

16. A method of a first wireless device, comprising:
sending a capabilities information element comprising at least one indicator having:
   a first value to indicate support by the first wireless device for use of a single user physical layer protocol data unit (SU PPDU) in a semi-orthogonal multiple access (SOMA) communication over a wireless network, and
   a second value to indicate support by the first wireless device for use of a multiple user PPDU (MU PPDU) in a SOMA communication over the wireless network,
wherein a first MU PPDU when used for a SOMA communication occupies respective one or more resource units of a transmission resource of the wireless network for carrying data to respective recipient wireless devices, the one or more resource units reserved for SOMA communications, wherein the first MU PPDU carries data modulated using a first modulation layer associated with a first constituent constellation for a first recipient wireless device, and the first MU PPDU carries data modulated using a second modulation layer associated with a second constituent constellation for a second recipient wireless device, and wherein the first and second constituent constellations are superposed to form a superposed constellation.

17. The method of claim 16, wherein the at least one indicator has a third value to indicate support by the first wireless device for use of both an SU PPDU and an MU PPDU in a SOMA communication over the wireless network.

18. The method of claim 16, further comprising:
receiving, by the first wireless device from a second wireless device, a capabilities information element comprising at least one indicator set to the first value or the second value; and
performing, by the first wireless device, SOMA communications with the second wireless device over the wireless network using an SU PPDU or an MU PPDU according to the value of the at least one indicator included in the capabilities information element sent by the first wireless device, and the value of the at least one indicator included in the capabilities information element received from the second wireless device.

19. The method of claim 16, wherein the capabilities information element further comprises at least a second indicator that specifies a power allocation factor that indicates an allocation of power between constituent constellations that are superposed to form a modulation constellation comprising constellation points representing respective data values communicated using SOMA.

20. The method of claim 19, wherein the at least the second indicator is settable to one of a plurality of values to indicate corresponding different power allocation factors, each power allocator factor of the different power allocation factors indicating a respective allocation of power between the constituent constellations.

21. The method of claim 16, further comprising:
sending, by the first wireless device, a first SU PPDU in a SOMA communication to a plurality of recipient wireless devices; and
receiving, by the first wireless device, acknowledgments of the first SU PPDU from the plurality of recipient wireless devices.

22. The method of claim 21, further comprising:
sending, by the first wireless device to the plurality of recipient wireless devices, control information identifying resource units to be used by the plurality of recipient wireless devices in transmitting the acknowledgments to the first wireless device.

23. The method of claim 16, further comprising:
sending, by the first wireless device, a given MU PPDU to a plurality of recipient wireless devices; and
receiving, by the first wireless device, acknowledgments of the given MU PPDU from the plurality of recipient wireless devices.

24. The method of claim 16, comprising:
performing, by the first wireless device, a SOMA communication using an SU PPDU responsive to the at least one indicator being set to the first value, and
performing, by the first wireless device, a SOMA communication using an MU PPDU responsive to the at least one indicator being set to the second value.

25. A non-transitory machine-readable storage medium comprising instructions that upon execution cause a first wireless device to:
send a first capabilities information element comprising at least a first indicator and a second indicator, the first indicator having:
   a first value to indicate support by the first wireless device for use of a single user physical layer protocol data unit (SU PPDU) in a semi-orthogonal multiple access (SOMA) communication over a wireless network, and
   a second value to indicate support by the first wireless device for use of a multiple user PPDU (MU PPDU) in a SOMA communication over the wireless network, and
the second indicator specifying a power allocation factor that indicates an allocation of power between constituent constellations that are superposed to form a modulation constellation comprising constellation points representing respective data values communicated using SOMA.

26. The non-transitory machine-readable storage medium of claim 25, wherein the instructions upon execution cause the first wireless device to:
perform a first SOMA communication using a first SU PPDU responsive to the first indicator being set to the first value, and
perform a second SOMA communication using a first MU PPDU responsive to the first indicator being set to the second value.

27. The non-transitory machine-readable storage medium of claim 26, wherein the instructions upon execution cause the first wireless device to:
receive, from a second wireless device, a second capabilities information element comprising at least one indicator set to the first value or the second value;
perform the first SOMA communication with the second wireless device over the wireless network using the first SU PPDU responsive to the first indicator in the first capabilities information element being set to the first value and the at least one indicator in the second capabilities information element being set to the first value; and
perform the second SOMA communication with the second wireless device over the wireless network using the first MU PPDU responsive to the first indicator in the first capabilities information element being set to the second value and the at least one indicator in the second capabilities information element being set to the second value.

28. The non-transitory machine-readable storage medium of claim 25, wherein the first indicator has a third value to indicate support by the first wireless device for use of both an SU PPDU and an MU PPDU in a SOMA communication over the wireless network.

29. The non-transitory machine-readable storage medium of claim 25, wherein the second indicator is settable to one of a plurality of values to indicate corresponding different power allocation factors, each power allocator factor of the different power allocation factors indicating a respective allocation of power between the constituent constellations.

30. A first wireless device comprising:
a network interface to communicate over a wireless network; and
at least one processor configured to:
receive, from a second wireless device, a capabilities information element comprising a first indicator and a second indicator, the first indicator having:
a first value to indicate support by the second wireless device for use of a single user physical layer protocol data unit (SU PPDU) in a semi-orthogonal multiple access (SOMA) communication over the wireless network, and
a second value to indicate support by the second wireless device for use of a multiple user PPDU (MU PPDU) in a SOMA communication over the wireless network, and
the second indicator specifying a power allocation factor that indicates an allocation of power between constituent constellations that are superposed to form a modulation constellation comprising constellation points representing respective data values communicated using SOMA.

31. The first wireless device of claim 30, wherein the at least one processor is configured to:
control a SOMA communication of the first wireless device using an SU PPDU responsive to the first indicator being set to the first value, and
control a SOMA communication of the first wireless device using an MU PPDU responsive to the first indicator being set to the second value.

32. The first wireless device of claim 30, wherein the at least one processor configured to:
send, to the second wireless device, a capabilities information element comprising at least one indicator set to:
the first value if the first wireless device supports using an SU PPDU in a SOMA communication, and
the second value if the first wireless device supports using an MU PPDU in a SOMA communication.

33. A method of a first wireless device, comprising:
receiving, from a second wireless device, a capabilities information element comprising a first indicator and a second indicator, the first indicator having:
a first value to indicate support by the second wireless device for use of a single user physical layer protocol data unit (SU PPDU) in a semi-orthogonal multiple access (SOMA) communication over a wireless network, and
a second value to indicate support by the second wireless device for use of a multiple user PPDU (MU PPDU) in a SOMA communication over the wireless network, and
the second indicator specifying a power allocation factor that indicates an allocation of power between constituent constellations that are superposed to form a modulation constellation comprising constellation points representing respective data values communicated using SOMA.

* * * * *